Figure 2:
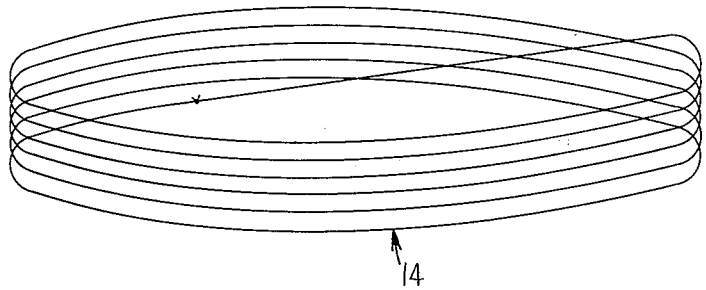

Sept. 10, 1957 N. H. THOMPSON, JR 2,805,540

ELASTIC POWER TRANSMISSION BELT

Filed March 15, 1956

INVENTOR.
N. H. THOMPSON, JR.
BY
ATTORNEY

United States Patent Office 2,805,540
Patented Sept. 10, 1957

2,805,540

ELASTIC POWER TRANSMISSION BELT

N. H. Thompson, Jr., Athens, Ga.

Application March 15, 1956, Serial No. 571,785

5 Claims. (Cl. 57—141)

This invention relates to power transmission belts and more particularly to a three ply elastic power transmission belt which is so fashioned that the juncture of the ends of the plies is almost invisible.

Elastic belts have become very popular to drive engines of various sorts because there is no necessity for strong tension on the belt in order to obtain sufficient friction to drive the pulleys over which the belt passes as is the case with the non-elastic variety. Elastic power transmission belts maintain constant tension and do not require frequent adjustment. Elastic belts are particularly desirable for driving devices such as: the hand piece of a dental engine; sewing machine drives; the comb, brushes and grinder cylinders of carding machines; high speed cameras; spinning frames and the like. In the past, elastic transmission belts have generally been fashioned by twisting together a plurality of strands of elastic yarn so as to form an elongated cord having loops at each end thereof. These loops were then joined by a metallic hook. The fact that these power transmission belts were not of constant cross section throughout the length of the band made for considerable wear as well as a certain amount of noise and unevenness in the drive afforded thereby.

Accordingly, it is an object of this invention to provide an elastic power transmission belt in which a continuous elastic cord is formed of a plurality of twisted elastic strands. The cord is so twisted as to form a three ply band having a pair of looped ends and a free end adjacent each of the looped ends, at least one of said free ends being slightly longer than the adjacent looped end. A twisted juncture of the band is formed in which one of the free ends passes through the other looped end, then through the adjacent looped end, said free end being joined so that the band is substantially constant in cross section.

Another object of this invention is to provide an elastic power transmission belt in which the belt is formed of three plies of twisted cord so that a loop and a free end occur at opposite ends of the twisted ply so that the loops as well as the free ends may be joined together so that the entire band is constructed of the same elastic material.

Another object of this invention is to provide an elastic power transmission belt which is of substantially constant cross section so that the juncture of the belt is not noticeable and so that undue wear will not occur at the juncture and so that the point of juncture will be equally as strong as the remainder of the belt.

I accomplish these and other objects of my invention by providing a method of forming an endless band consisting essentially of twisting a plurality of elastic strands to form a cord; allowing the cord thus formed to twist into a three ply band having a pair of looped ends and a free end adjacent each of the looped ends, at least one of said free ends being slightly longer than the adjacent looped end; placing one of the free ends first through the other looped end and then through the adjacent looped end and then joining the free ends, whereby when released the cord twists together to form an almost invisible juncture.

Figure 1:
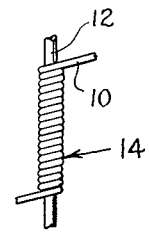
Figure 3:
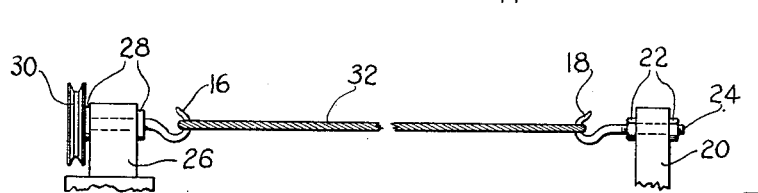
Figure 4:
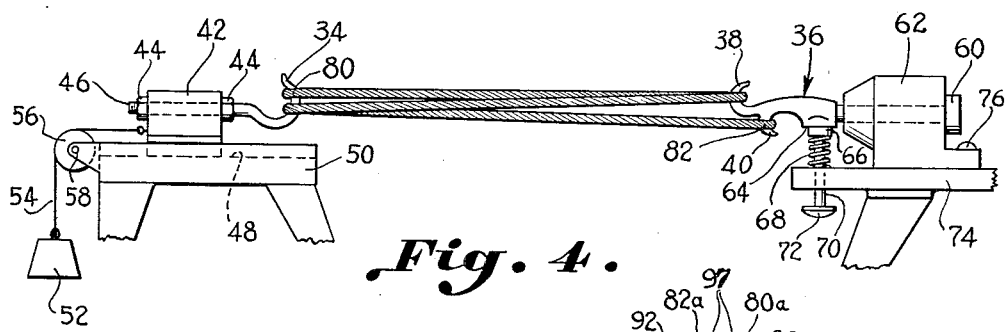
Figure 5:
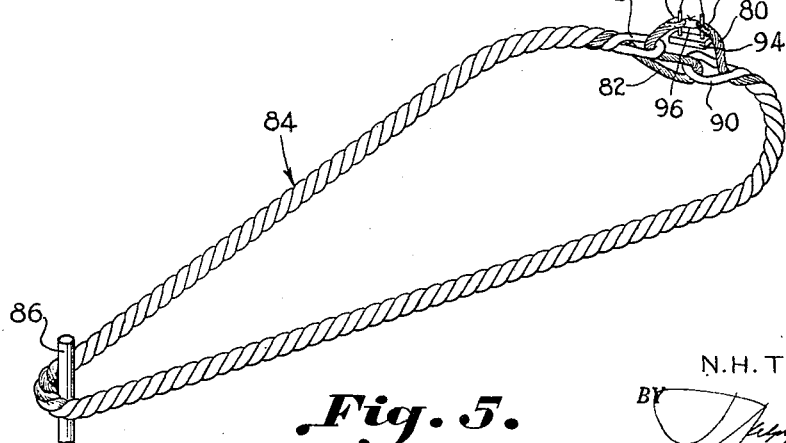

While some of the objects have been stated above, others will become apparent to those skilled in the art relating to endless bands when the specification is read in connection with the accompanying drawing in which:

Fig. 1 is an elevation showing the mode of constructing the strands from which the power transmission belt is eventually fashioned, Fig. 2 is a schematic view showing the means of joining the strands to form a cord, Fig. 3 is an elevation showing the apparatus which twists the strands shown in Fig. 2 so as to form a cord, Fig. 4 is an elevation showing the apparatus for holding the cord so that the cords may twist into a three ply band, and Fig. 5 is a perspective view showing the manner of joining the ends of the band formed as shown in Fig. 4.

Referring more particularly to the drawings Fig. 1 shows a strand of textile material 10 being wound around an elastic core 12 to form a strand of elastic material 14 which will be used as described below to form an elastic power transmission belt. Fig. 2 shows schematically that a substantial length of elastic material 14 is wound in successive convolutions between a pair of hooks 16 and 18 as shown in Fig. 3. It will be noted that the hook 18 is fixedly poitioned on a support 20 by the nuts 22 which are threadably carried by a threaded portion 24 on the shank of the hook 18. It will also be noted that the hook 16 is rotatably mounted on the support 26, which carries bearings 28, and that the shank of the hook 16 is adapted to be driven by the pulley 30 which is fixedly mounted thereon and suitably driven, preferably by automatically operable means.

Referring now to Figs. 3 and 4, it will be noted that the strands 14 are twisted in the usual manner to form a cord 32 which is removed from the hooks 16 and 18 and placed on the hooks 34 and 36. The hook 36 is a double hook having an upwardly and rearwardly curving hook portion 38 and a downwardly and rearwardly curving hook portion 40 which is further back on the shank of the hook 36 than the hook portion 38. The hook 34 is fixedly mounted on the block 42 by the nuts 44 which are threadably carried by the threaded shank 46 of the hook 34. The block 42 is slidably positioned in a groove 48 provided therefor in the support 50. The block carries a weight 52 which is secured thereto by the cord 54 which passes over the pulley 56 which is rotatably mounted as at 58 on the support 50.

The hook 36 is rotatably mounted in a suitable bearing 60 which is positioned in the support 62. The intermediate portion of the shank of the hook 36 has a flat portion 64 against which a flat confining element 66 bears by virtue of being normally pressed thereagainst by the compression coiled spring 68. The bearing element 66 is carried by the shank 70 which carries a head 72 thereon at its opposite end so as to limit the upward motion of the shank in the table 74. The supporting element 62 is normally positioned on the table 74 as by bolts 76.

It will be noted that one of the ends 80 of the cord 32 is placed over the hook 34 and then the band 32 is passed around the forwardly extending hook 38, again around the hook 34 and then the other end 82 is placed over the backwardly extending hook 40 so as to form three plies. It is desirable at this point to turn the portion of the cord 32 which is placed on the hook 38 so that the three plies will be parallel in order to place an even twist in the three plies. The hook 36 is then allowed to turn freely by depressing the confining element 66 against the spring 68 so that the twist which is stored in the elastic cord 32 twists the various plies together forming the length of band shown in Fig. 5 and broadly designated at 84.

The band or belt 84 is first passed around a stationary peg 86 at about the middle thereof and the free end 82 is passed through the loop 90 which has been formed in the belt 84. Then the free end 82 is passed through the loop 92 which was formed in the adjacent end of the belt 84. It is now apparent that the hook 40 was placed further back on the shank of the hook 36 so that the free end 82 might be slightly longer than the end 80 which is of a length equal to loop 90. Actually either or both of the free ends 80a and 82a may be longer than the adjacent loops 90 and 92. The free ends 80 and 82 have smaller loops 80a and 82a respectively and are placed over a pair of adjacent pegs 97 which are held in suitably spaced relationship by the support 94. The loops 82a and 80a are joined by a short portion of elastic 96 which is of the same type as used to form the band. The twist which is stored in the elastic strands 14 then causes the loops 92 and 90 to twist closely together as well as the ends 82 and 80 so that the juncture of the band is almost unnoticeable.

It has been found that the friction and wearing properties of the band are improved by dipping the otherwise complete band in a dip of liquid latex or the like and then stretching the bands on racks to dry and set. The interstices between the strands are thus filled and an improved friction or gripping is presented for contact with the elements to be driven. The extent to which the bands are stretched on the racks limits the extent to which the bands may afterward conveniently be stretched to that amount. A tougher and more durable band may be constructed if the elastic strands used are made with nylon or the like.

It is thus seen that I have provided an elastic power transmission belt which is constructed of the same material throughout and which results in superior performance. Since the band is of three ply construction, a smoother working surface is presented by the band than would be the case with two ply construction. Experiments have demonstrated that little if any more wear occurs at the juncture than throughout the remainder of the band. The band thus formed has all of the advantages inherent in elastic bands and none of the disadvantages which were formally occasioned by the necessity of joining the band by a metallic clip.

While a preferred embodiment of my invention has been described using specific terms, such description is for illustrative purposes only, and it is to be understood that changes and variations may be made without departing from the spirit or scope of the invention as defined by the appended claims.

I claim as my invention:

1. The method of forming an endless elastic band comprising, twisting a cord having a plurality of elastic strands into a three ply band having a pair of looped ends and a free end adjacent each of the looped ends, at least one of said free ends being slightly longer than the adjacent looped end, placing one of the longer free ends through both of the looped ends, so that the free ends form three plies between the loops and thus join the loops, and then joining the free ends, whereby when released the cord twists together to form an almost invisible juncture.

2. The method of forming an endless elastic band comprising, twisting a plurality of elastic strands to form a cord, placing the cord thus formed on holding means so that the cord has three aligned plies, permitting at least one of the holding means to rotate allowing the cord to twist into a three ply band having a pair of looped ends and a free end adjacent each of the looped ends, one of said free ends being slightly longer than the adjacent looped end and the other free end being equal in length to the other looped end, placing the longer free end first through the other looped end and then through the adjacent looped end and then joining the free ends, whereby when released the cord twists together to form an almost invisible juncture.

3. The method of forming an endless elastic band comprising, twisting a plurality of elastic strands to form a cord, placing the cord thus formed on holding means so that the cord has three aligned plies, permitting at least one of the holding means to rotate allowing the cord to twist into a three ply band having a pair of looped ends and a free end adjacent each of the looped ends, at least one of said free ends being slightly longer than the adjacent looped end and, placing at least one of the free ends through both of the looped ends, so that the free ends form three plies between the loops and join the loops, tieing the free ends with a short length of elastic strand, then releasing the cord allowing the juncture to twist together, then dipping the entire band in a liquid latex dip and placing the band on a rack to dry and set.

4. An endless elastic power transmission belt comprising, a continuous elastic cord formed of a plurality of twisted elastic strands, said cord being twisted so as to form a three ply band having a pair of looped ends and a free end adjacent each of the looped ends, at least one of said free ends being slightly longer than the adjacent looped end, and a twisted juncture of the cord in which at least one of the free ends passes through both of the looped ends, so that the free ends form three plies between the loops and join the loops, said free ends being joined together, whereby the band is of substantially constant cross section.

5. An endless elastic power transmission belt comprising, a continuous elastic cord formed of a plurality of twisted elastic strands, said cord being twisted so as to form a three ply band having a pair of looped ends and a free end adjacent each of the looped ends, one of said free ends being slightly longer than the adjacent looped end and the other free end being equal in length to the other looped end and a twisted juncture of the band in which the longer free end passes first through the other looped end and then through the adjacent looped end, said free ends being joined together, whereby the band is of substantially constant cross section.

References Cited in the file of this patent

UNITED STATES PATENTS

| | | |
|---|---|---|
| 2,109,717 | Arnold | Mar. 1, 1938 |
| 2,760,330 | Lowney | Aug. 28, 1956 |